[19] United States Patent
Dattagupta et al.

(10) Patent No.: US 8,650,311 B2
(45) Date of Patent: Feb. 11, 2014

(54) CLIENT DEVICE CONFIGURED TO CONNECT WITH A HOME NETWORK

(75) Inventors: Siddhartha Dattagupta, Irvine, CA (US); John Furlan, Belmont, CA (US); Mark Carroll, Saratoga, CA (US); Chong Liang Li, Irvine, CA (US); Insung Kim, Irvine, CA (US); Edward James, San Jose, CA (US); Matthew Tebbs, Seattle, WA (US); Craig Hobbs, Seattle, WA (US); Mark Chekhanovskiy, San Jose, CA (US); Dan Nguyen, Huntington Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 363 days.

(21) Appl. No.: 13/092,054

(22) Filed: Apr. 21, 2011

(65) Prior Publication Data

US 2011/0264730 A1 Oct. 27, 2011

Related U.S. Application Data

(60) Provisional application No. 61/327,072, filed on Apr. 22, 2010.

(51) Int. Cl.
*G06F 15/16* (2006.01)

(52) U.S. Cl.
USPC .............................. 709/228; 709/220; 709/229

(58) Field of Classification Search
USPC .......................... 709/220–222, 227–229, 245
See application file for complete search history.

(56) References Cited

U.S. PATENT DOCUMENTS

| 7,535,880 | B1 * | 5/2009 | Hinman et al. | 370/338 |
|---|---|---|---|---|
| 7,583,684 | B2 * | 9/2009 | Cheng | 370/401 |
| 7,633,909 | B1 * | 12/2009 | Jones et al. | 370/338 |
| 7,647,048 | B2 * | 1/2010 | Brok et al. | 455/435.2 |
| 7,904,608 | B2 * | 3/2011 | Price | 710/11 |
| 7,924,793 | B2 * | 4/2011 | Savoor et al. | 370/338 |
| 8,116,287 | B2 * | 2/2012 | Krantz et al. | 370/338 |
| 8,165,101 | B2 * | 4/2012 | Abhishek et al. | 370/338 |
| 2007/0159997 | A1 * | 7/2007 | Tsai et al. | 370/328 |
| 2008/0220741 | A1 * | 9/2008 | Hung | 455/411 |
| 2010/0296441 | A1 * | 11/2010 | Barkan | 370/328 |

* cited by examiner

*Primary Examiner* — Patrice Winder
(74) *Attorney, Agent, or Firm* — Patterson & Sheridan, LLP

(57) ABSTRACT

A smart network may include a smart network host device as well as one or more client devices configured to connect to the smart network. Each of the client devices may implement one or more services that the client device exposes to other devices connected to the smart network. A client device configured to connect to the smart network may implement one or more modules configured to facilitate connecting to the smart network, registering the client device or services running on the client device with the smart network, diagnosing issues with the client device or the smart network, and upgrading the firmware of the client device. The client device may be configured to perform the various operations with minimal input from an owner of the smart network.

18 Claims, 12 Drawing Sheets

CLIENT DEVICE CONFIGURED TO CONNECT WITH A HOME NETWORK

CROSS-REFERENCE TO RELATED APPLICATIONS

This application claims benefit of U.S. provisional patent application Ser. No. 61/327,072, filed Apr. 22, 2010, which is herein incorporated by reference in its entirety.

BACKGROUND

1. Technical Field

The present disclosure relates generally to wireless networks and, more specifically, to a client device configured to connect with a home network.

2. Description of the Related Art

Home networks, in which multiple computing and/or peripheral devices are communicatively linked together in a consumer's home, are becoming increasingly ubiquitous. A home environment may include one or more computers, a wireless router, a dsl modem, and one or more other devices capable of connecting to the home network. Conventionally, each device in the home network must be individually configured to connect to the network and, once configured, may then communicate with each of the other devices attached to the home network.

In practice, however, procedures for establishing and provisioning services on a home network are typically too involved for the majority of home network users to implement reliably. For example, a network user may need to manually reconfigure the home network router, determine a network IP address and/or hostname for each device, establish network credentials, register the various services for each device, etc. Furthermore, in order for a device to locate another device on the home network, a device must establish communication using a unique IP address of the other device. Such connections are typically defined as peer-to-peer connections. A user may be required to manually keep track of which address is associated with which device or service in order to configure the devices to communicate on the home network. The manual configuration procedures described above make it a challenge for unsophisticated users to reliably setup a home network and provision services on the home network.

Accordingly, there is a need in the art for systems and methods that reliably and conveniently enable the user of a home network to automatically configure and provision devices to connect to the home network.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

Figure 1A:
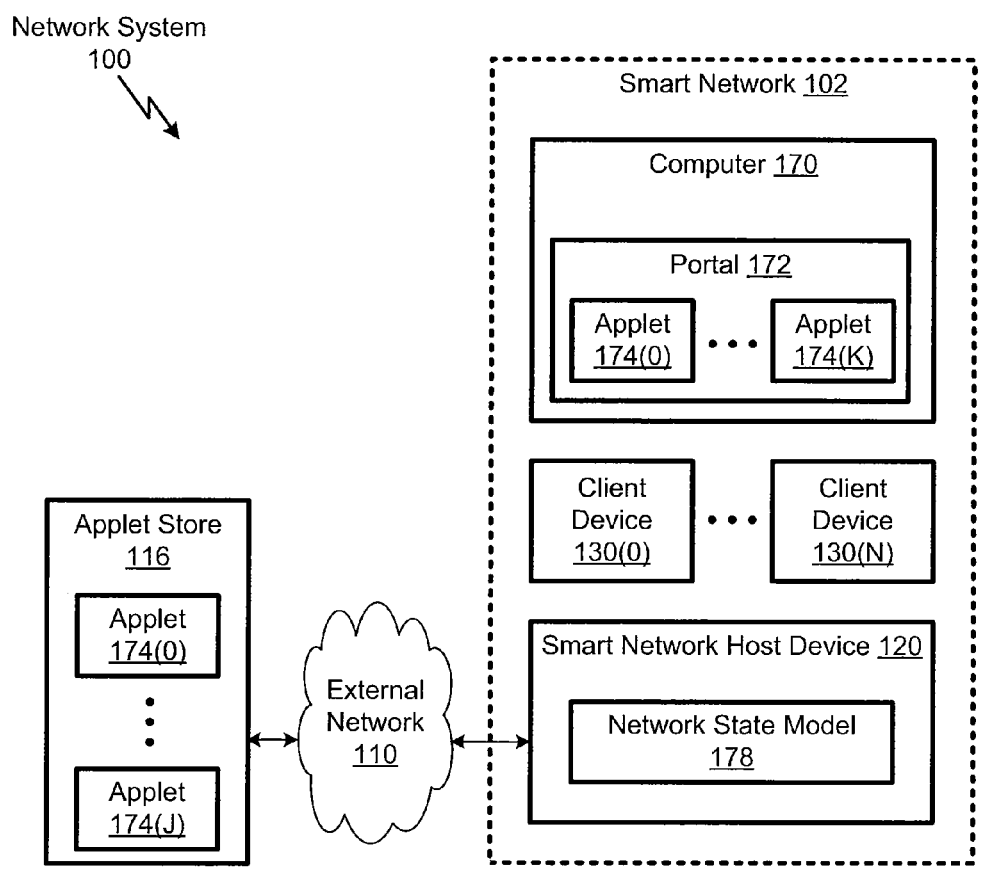
FIG. 1A is an exemplary illustration of an overarching network system configured to implement one or more aspects of the present invention.

In the following description, numerous specific details are set forth to provide a more thorough understanding of various example embodiments of the invention. However, it will be apparent to one of skill in the art that certain embodiments of the invention may be practiced without one or more of these specific details. In other instances, well-known features have not been described in order to avoid obscuring the invention.

Overview

One example embodiment of the present invention sets forth a method comprising establishing a connection with a wireless access point that is associated with a wireless home network, transmitting information related to a client device to a network host machine that is associated with the wireless home network via the wireless access point, receiving an SSID (Service Set Identifier) corresponding to a new wireless access point that is to be associated with the wireless home network, wherein the new wireless access point is selected by the network host machine based on the transmitted information related to the client device, and establishing a new connection with the new wireless access point corresponding to the SSID. The method also includes the steps of transmitting a message to the network host machine requesting that the network host machine register the client device with the wireless home network, and receiving a response message from the network host machine specifying a fully qualified domain name that has been assigned to the client device by the network host machine. The method includes the further steps of transmitting diagnostic information related to the client device to the network host machine, querying the network host machine to request additional diagnostic information related to other devices also connected to the wireless home network, receiving a response message from the network host machine that includes the additional diagnostic information related to the other devices, and transmitting the diagnostic information and the additional diagnostic information to a service hosted on a machine that is connected to the wireless home network or to a machine that is connected to a remote network. The method includes yet the further steps of determining whether firmware installed on the client device is out of date by comparing a version number associated with the firmware to a version number associated with new firmware available on a machine associated with a remote network, and if the firmware installed on the client device is not out of date, then scheduling a future time to re-determine whether the firmware installed on the client device is out of date, or if the firmware installed on the client device is out of date, then downloading the new firmware from the machine associated with the remote network and installing the new firmware on the client device.

Another example embodiment of the present invention sets forth a client device comprising a network discovery module that is configured to establish a connection with a wireless access point that is associated with a wireless home network, transmit information related to the client device to a network host machine that is associated with the wireless home network via the wireless access point, receive an SSID (Service Set Identifier) corresponding to a new wireless access point that is to be associated with the wireless home network, wherein the new wireless access point is selected by the network host machine based on the transmitted information related to the client device, and establish a new connection with the new wireless access point corresponding to the SSID. The client device further includes a registration module configured to transmit a message to the network host machine requesting that the network host machine register the client device with the wireless home network, and receive a response message from the network host machine specifying a fully qualified domain name that has been assigned to the client device by the network host machine. The client device further includes a diagnostic module configured to transmit diagnostic information related to the client device to the network host machine, query the network host machine to request additional diagnostic information related to other devices also connected to the wireless home network, receive a response message from the network host machine that includes the additional diagnostic information related to the other devices, and transmit the diagnostic information and the additional diagnostic information to a service hosted on a machine that is connected to the wireless home network or to a machine that is connected to a remote network. The client device yet further includes a firmware upgrade module configured to determine whether firmware installed on the client device is out of date by comparing a version number associated with the firmware to a version number associated with new firmware available on a machine associated with a remote network, and if the firmware installed on the client device is not out of date, then schedule a future time to re-determine whether the firmware installed on the client device is out of date, or if the firmware installed on the client device is out of date, then download the new firmware from the machine associated with the remote network and install the new firmware on the client device.

Yet another example embodiment of the present invention sets forth a computer-readable medium including instructions that, when executed by a processing unit, cause the processing unit to perform the steps of establishing a connection with a wireless access point that is associated with a wireless home network, transmitting information related to a client device to a network host machine that is associated with the wireless home network via the wireless access point, receiving an SSID (Service Set Identifier) corresponding to a new wireless access point that is to be associated with the wireless home network, wherein the new wireless access point is selected by the network host machine based on the transmitted information related to the client device, and establishing a new connection with the new wireless access point corresponding to the SSID. The computer readable medium also includes instructions for performing the steps of transmitting a message to the network host machine requesting that the network host machine register the client device with the wireless home network, and receiving a response message from the network host machine specifying a fully qualified domain name that has been assigned to the client device by the network host machine. The computer readable medium also includes further instructions for performing the steps of transmitting diagnostic information related to the client device to the network host machine, querying the network host machine to request additional diagnostic information related to other devices also connected to the wireless home network, receiving a response message from the network host machine that includes the additional diagnostic information related to the other devices, and transmitting the diagnostic information and the additional diagnostic information to a service hosted on a machine that is connected to the wireless home network or to a machine that is connected to a remote network. The computer readable medium includes yet further instructions for performing the steps of determining whether firmware installed on the client device is out of date by comparing a version number associated with the firmware to a version number associated with new firmware available on a machine associated with a remote network, and if the firmware installed on the client device is not out of date, then scheduling a future time to re-determine whether the firmware installed on the client device is out of date, or if the firmware installed on the client device is out of date, then downloading the new firmware from the machine associated with the remote network and installing the new firmware on the client device.

DETAILED DESCRIPTION OF THE FIGURES

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
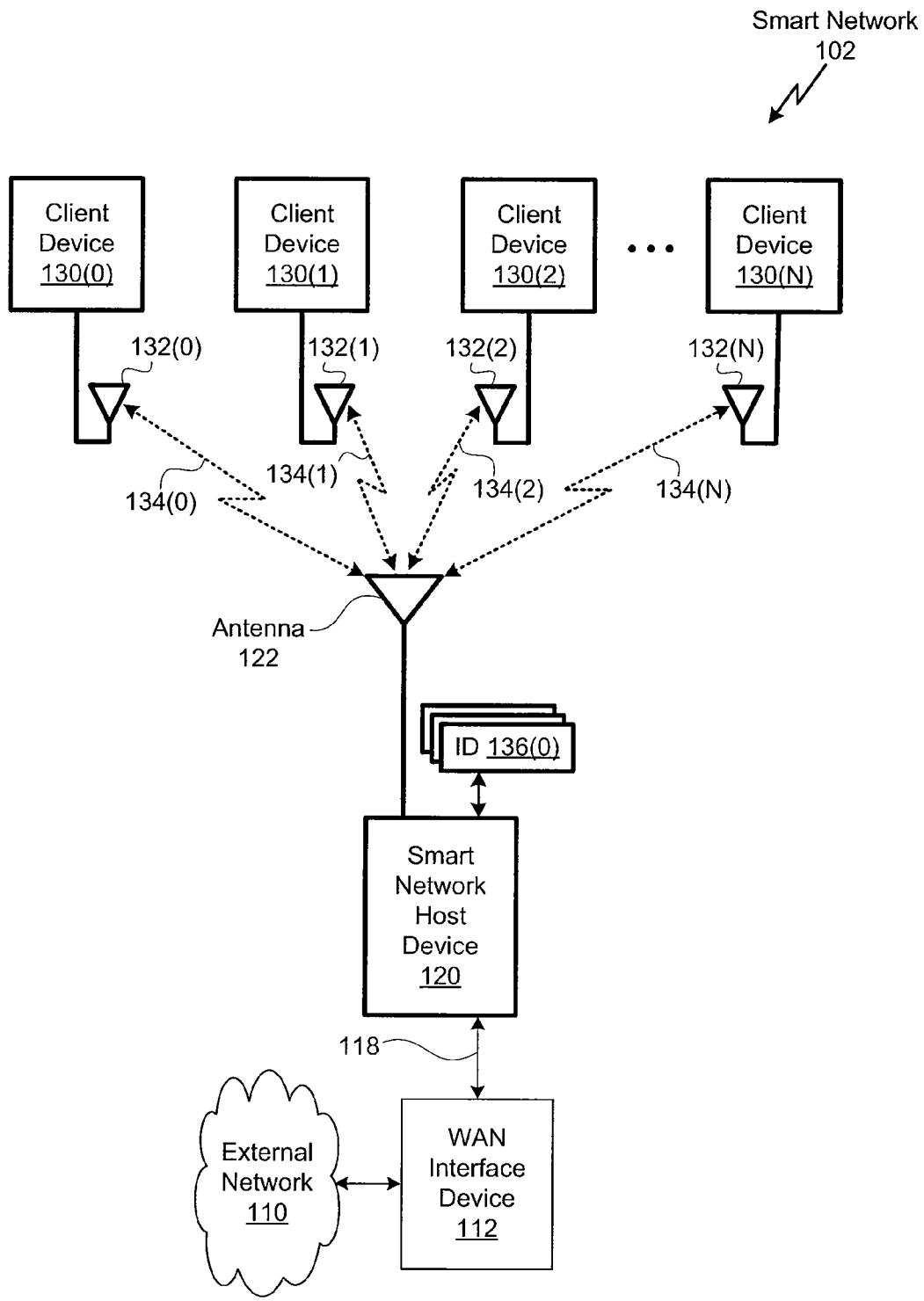
FIG. 1B illustrates the smart home network of FIG. 1A, according to one example embodiment of the present invention.

FIG. 1B illustrates the smart home network 102 of FIG. 1A, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

FIG. 10 illustrates the smart home network 102 of FIG. 1A, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1C:
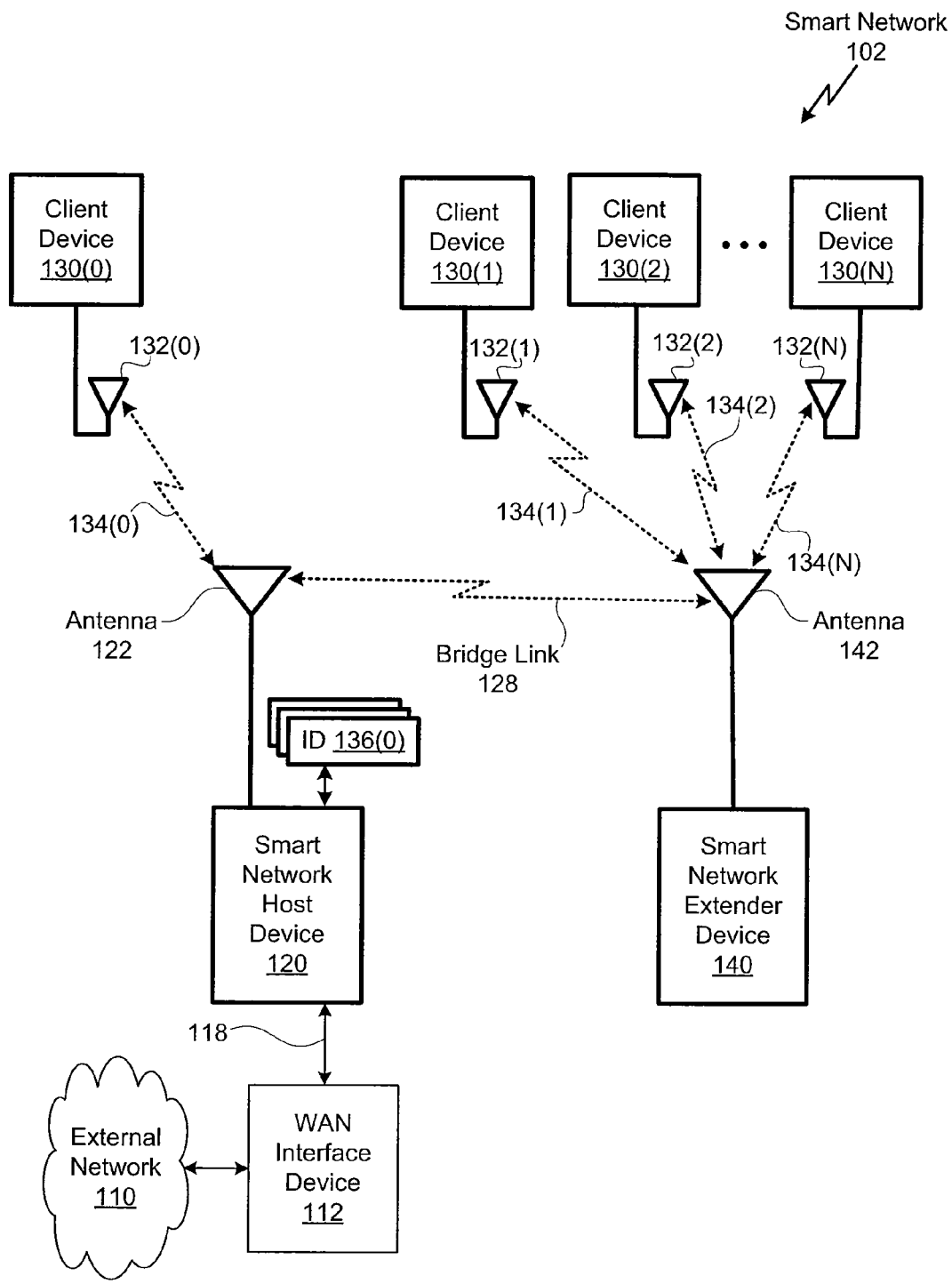
FIG. 1C illustrates the smart home network of FIG. 1A, according to another example embodiment of the present invention.
Figure 1D:
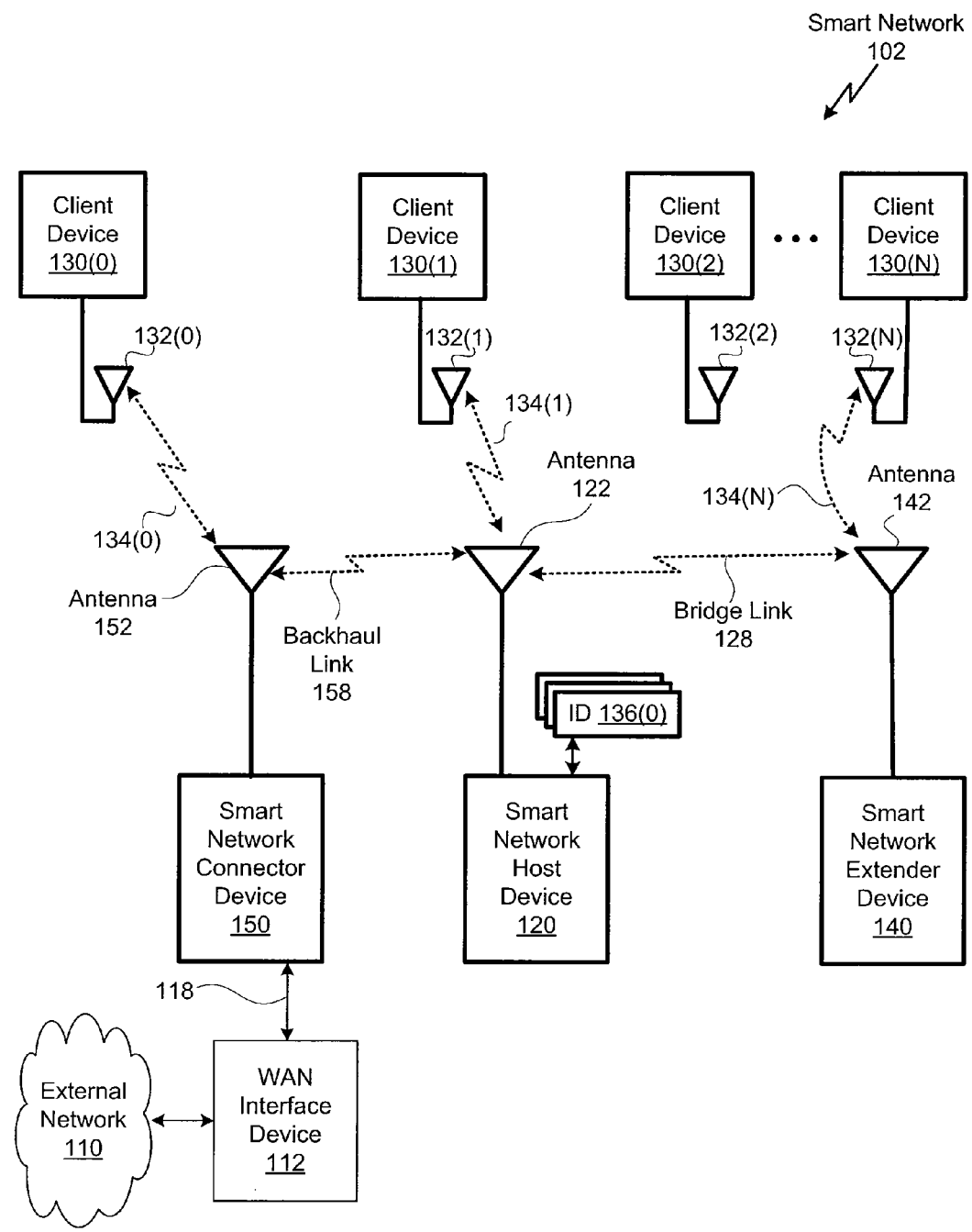
FIG. 1D illustrates the smart home network of FIG. 1A, according to yet another example embodiment of the present invention.

FIG. 1D illustrates the smart home network 102 of FIG. 1A, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
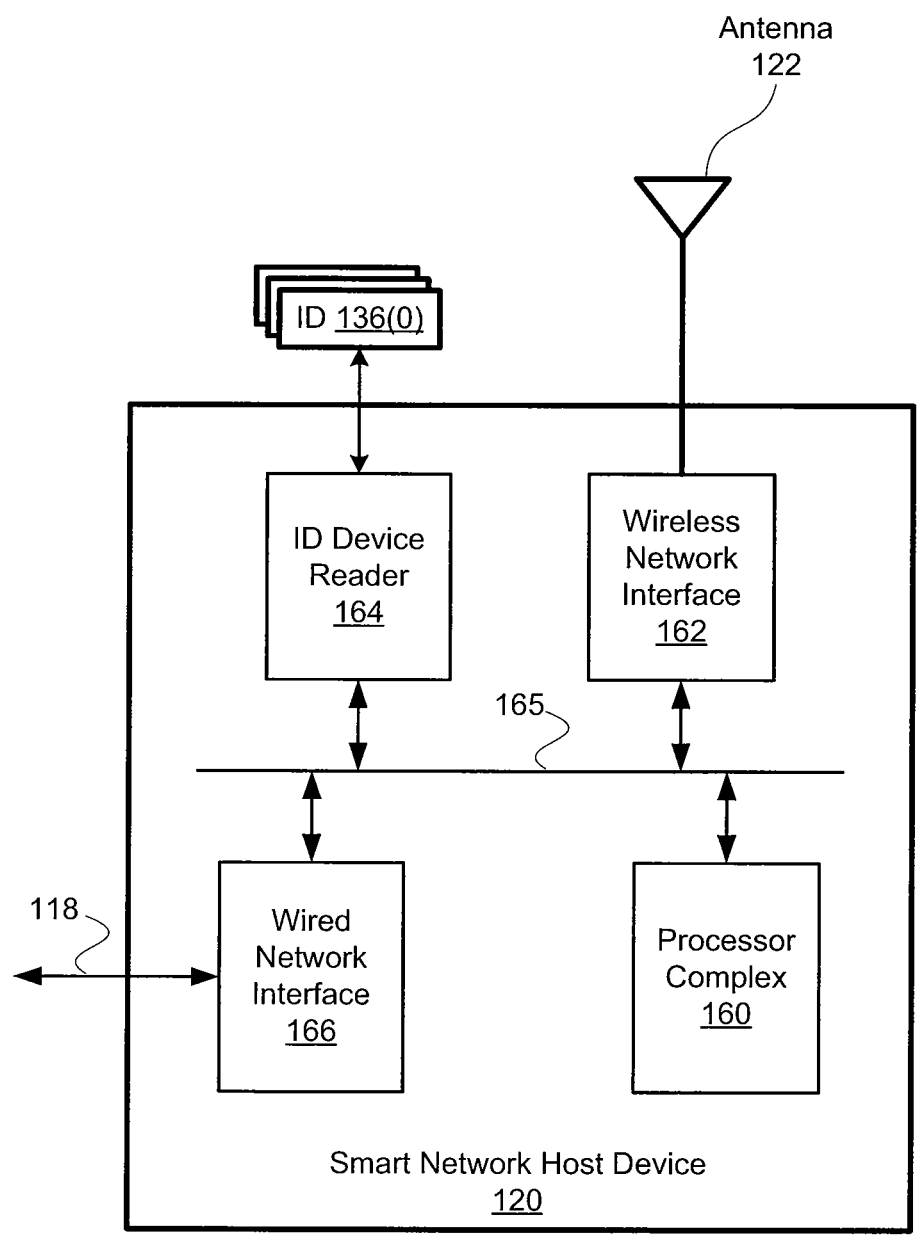
FIG. 1E is a more detailed illustration of the smart network host device of FIG. 1A, according to one example embodiment of the present invention.

FIG. 1E is a more detailed illustration of the smart network host device 120 of FIG. 1A, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
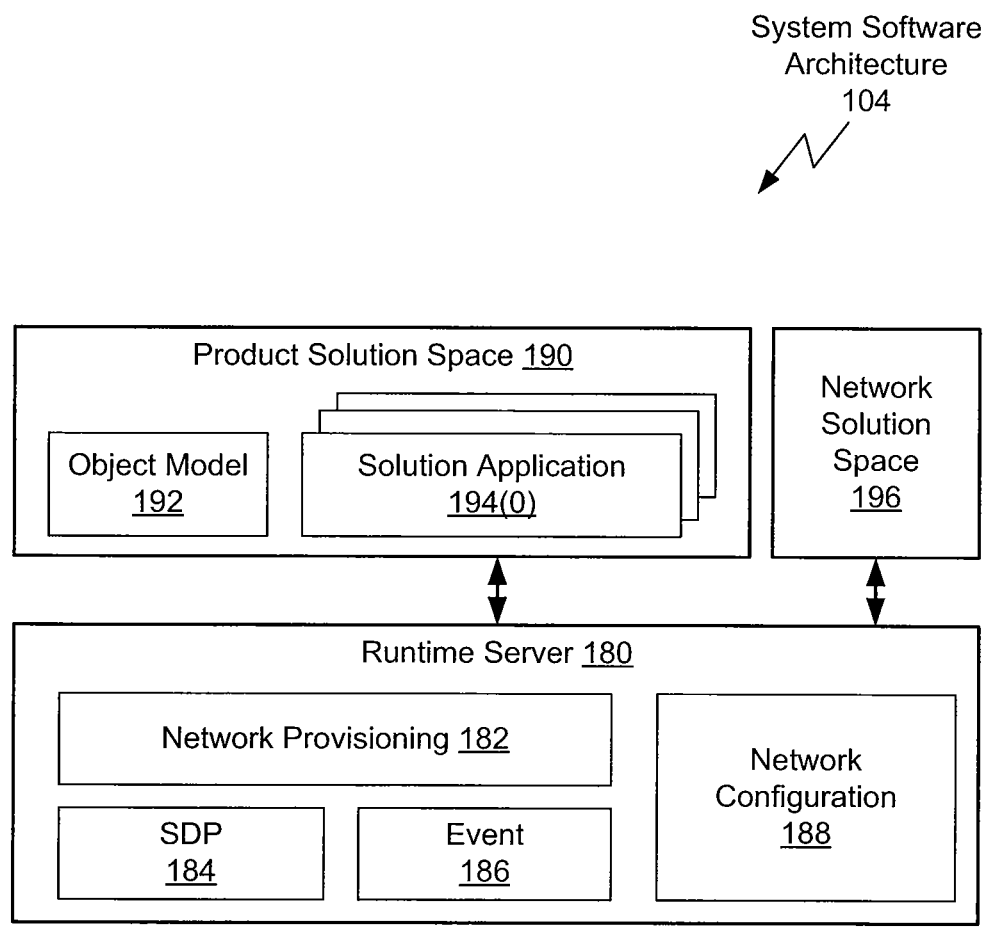
FIG. 1F illustrates a system software architecture for the smart network host device of FIG. 1E, according to one example embodiment of the present invention.

FIG. 1F illustrates a system software architecture for the smart network host device of FIG. 1E, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
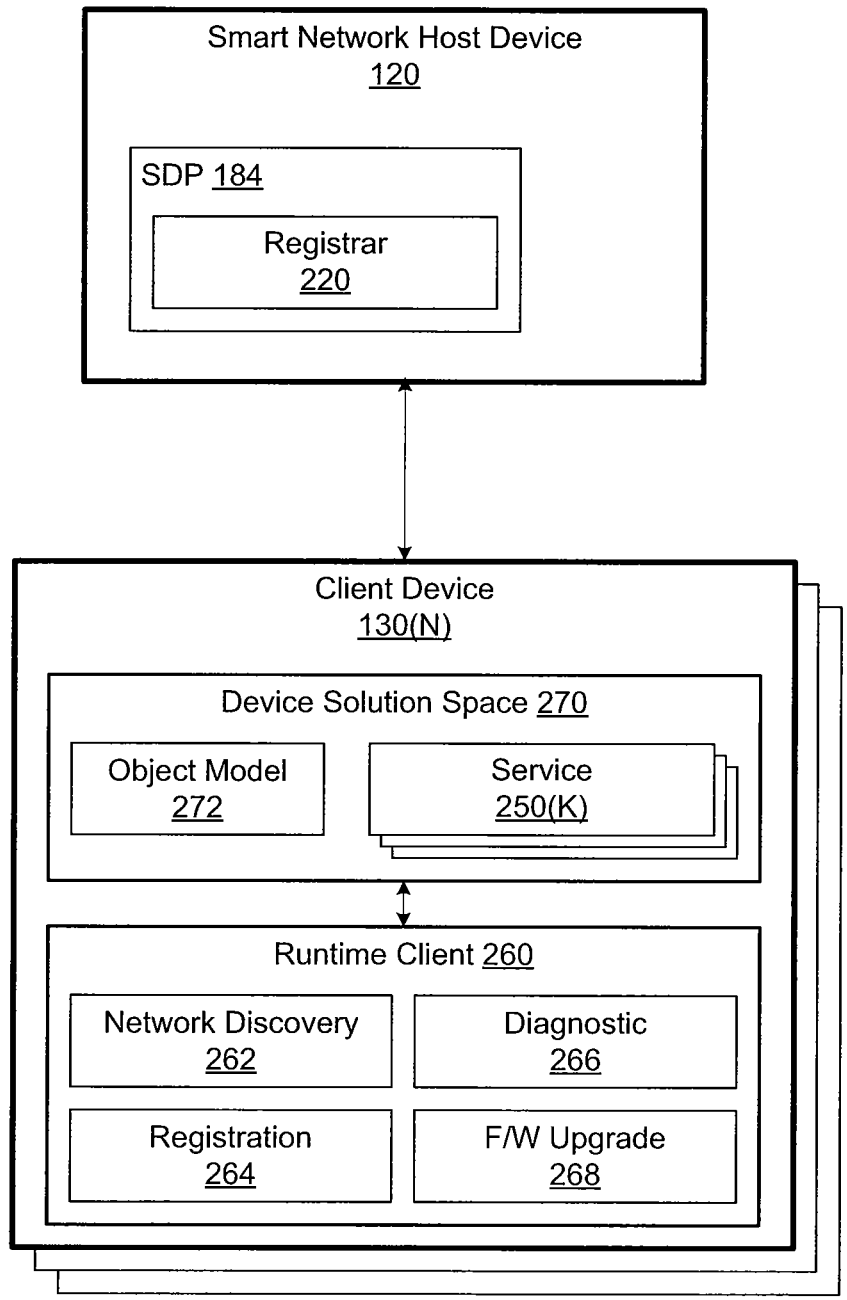
FIG. 2 illustrates a device architecture for a client device configured to connect with the smart network host device, according to one example embodiment of the present invention.

FIG. 2 illustrates a device architecture for a client device 130(N) configured to connect with the smart network host device 120, according to one example embodiment of the present invention. One or more client devices 130 may be connected to the smart network host device 120. In one embodiment, each client device 130(N) may include one or more processors and a memory for storing one or more software modules configured to implement the device architecture. Programming instructions stored within the memory of the client device 130(N), when executed on the one or more processors of the client device 130(N), may implement at least a portion of the device architecture. In other embodiments, portions of the device architecture may be implemented in hardware units.

As also shown in FIG. 2, the smart network host device 120 includes an SDP module 184 that implements one or more services within the runtime server 180 executing on the smart network host device 120. As described above in connection with FIG. 1F, the SDP module 184 maintains a persistent view of different network devices and related services, based on data from the event module 186 and on data from the different client devices 130. In one embodiment, the SDP module 184 includes a registrar server 220, which implements an application programming interface (API) that enables a client device 130(N) to register with the smart network host device 120 and discover other client devices 130 and services 250 connected to the smart network 102.

The device architecture includes a runtime client 260 and a device solution space 270. The device solution space 270 includes an object model 272, similar to object model 192 discussed above, and one or more services 250 that may be registered with the smart network host device 120 and made available to one or more other client devices 130 connected to the smart network 102. Services 250 may provide device-specific functionality to a client device 130(N), such as decoding streaming media transmitted to the client device 130(N) from the external network 110 and displaying the streaming media on a display associated with the client device 130(N). In one embodiment, the services 250 registered with the smart network host device 120 may be made available to one or more remote devices (not shown) connected to the smart network 102 via the external network 110.

In one embodiment, services 250 implement inter-process communications by transmitting XML messages via a network interface of a client device 130(N). A service 250(K) may be defined as a set of zero or more simple object access protocol (SOAP) actions and zero or more service events and may be implemented as a set of software instructions that are executed on one or more processors included in the client device 130(N). A service 250(K) may be configured to send or receive XML-SOAP messages via a network interface of the client device 130(N) in order to communicate with other client devices 130 or services 250 connected to the smart network 102. Each service 250(K) running on a client device 130(N) may be accessible through a different port of a network interface implemented on the client device 130(N), and multiple instances of the same service 250(K) may be accessible through different ports of the host device as well. Each service 250(K) may be associated with a version number that identifies the particular set of operations defined by the service, which may be used to detect and prompt for updates to be downloaded to the client device 130(N) by querying a server made available on the smart network 102 or on a portal located on the external network 110.

The runtime client 260 includes a network discovery module 262, a registration module 264, a diagnostic module 266, and a firmware upgrade module 268. It will be appreciated that the network discovery module 262, the registration module 264, the diagnostic module 266, and the firmware upgrade module 268 may be implemented in either hardware or software on the client device 130(N).

The network discovery module 262 is configured to implement operations that enable the client device 130(N) to discover and connect to the smart network 102. For example, the network discovery module 262 may include a DHCP client for requesting an IP address to be assigned to the client device 130(N) and a DNS client that enables the client device 130(N) to resolve domain names for different devices or services into an IP address on the smart network 102 or the external network 110. In one embodiment, the network discovery module 262 may be configured to receive broadcast data packets on an antenna 132(N) of the client device 130(N) that indicate one or more SSIDs of various wireless networks within range of the client device 130(N). The client device 130(N) may determine which wireless access point to connect to based on one or more selection criteria included in the network discovery module 262. For example, the client device 130(N) may be configured to connect to the wireless access point with the strongest signal which may indicate the wireless access point in closest proximity to the client device 130(N). In another embodiment, the client device 130(N) may be configured to connect to a wireless network configured with a well-known SSID, such as homenetwork.

In yet another embodiment, the client device 130(N) may connect to the smart network 102 via a wired interface such as the wired network interface 166 of the smart network host device 120. For example, the client device 130(N) may be connected to the smart network host device 120 via an Ethernet cable. In other embodiments, the client device 130(N) may connect to the smart network 102 via a wired interface of a smart network extender device 140 or a wired interface of a smart network connector device 150.

For example, the smart network host device 120 may be configured as a wireless access point that hosts multiple virtual access points. A first virtual access point is configured with a well-known SSID that provides basic connectivity for a client device 130(N) to attempt to connect to the smart network 102. Each client device 130(N) may be configured to attempt to connect to any available access points associated with the well-known SSID. A second virtual access point may be configured with an SSID unique to the smart network host device 120. A client device 130(N) may not know the SSID associated with the second virtual access point the first time the client device 130(N) attempts to connect to the smart network host device 120. Thus, the client device 130(N) may be configured to connect to the first virtual access point in order to attempt to authenticate the client device 130(N) with the smart network 102 using network credentials passed to the smart network host device 120 via an ID device 136(N) associated with the client device 130(N). In one embodiment, the client device 130(N) and the smart network host device 120 are configured to perform an authentication procedure based on the Extensible Authentication Protocol where a handshake is performed between the client device 130(N) and the smart network host device 120 to authenticate the network credentials without broadcasting the network credentials on the wireless link established via the first virtual access point. Based on the successful authentication of the client device 130(N) with the smart network host device 120, the smart network host device 120 may transmit the SSID associated with the second virtual access point to the client device 130 via the link established with the first virtual access point. The client device 130(N) may store the SSID of the second virtual access point in a memory of the client device 130(N) so that the client device can re-connect directly to the second virtual access point at a subsequent time without having to authenticate itself over the first virtual access point. A third virtual access point may be configured manually by an owner of the smart network host device 120, creating a unique SSID and credentials for the third virtual access point. The owner may establish a password to access the third virtual access point via well-known wireless security protocols such as WPA or WEP. The client device 130(N) may store the SSID and the credentials for the third virtual access point in the memory to facilitate re-connection to the third virtual access point on subsequent attempts to connect to the smart network 102. In one embodiment, the first and second virtual access points are transparent to the owner and are configured to perform background functions for automatic discovery, connection, and provisioning of the smart network with an associated client device 130(N).

In one embodiment, the network discovery module 262 may be configured to generate and transmit an XML-SOAP message to the smart network host device 120 that includes details about the services 250 and capabilities of the client device 130(N). The smart network host device 120 may be configured to provide additional virtual access points associated with additional SSIDs for the smart network 102. The runtime server 180 of the smart network host device 120 may be configured to determine, based on the information received from the client device 130(N), a level of service the client device 130(N) requests for proper operation, such as a minimum bandwidth of the wireless link. Then, the runtime server 180 may determine that the client device 130(N) should connect to a particular virtual access point provided by the smart network host device 120 in order to provide the client device 130(N) with a particular level of service. For example, the smart network host device 120 may be configured to provide different levels of service on different virtual access points. In this manner, the smart network host device 120, which may operate on both the 2.4 GHz and 5 GHz bands specified by the IEEE 802.11n wireless protocol, may force a particular client device 130(N) to connect via the 2.4 GHz band and not the 5 GHz band, as specified by different SSIDs.

The registration module 264 is configured to implement operations that enable the client device 130(N) and any services 250 exposed to the smart network 102 by the client device 130(N) to be registered with a central authority for the smart network 102, such as the smart network host device 120. In one embodiment, the registration module 264 may be configured to generate and transmit XML-SOAP messages to the smart network host device 120 requesting the smart network host device 120 to register the client device 130(N) and services 250 on the smart network 102. The registrar server 220 on the smart network host device 120 may assign a fully qualified domain name (FQDN) to the client device 130(N) and transmit an XML-SOAP message to the client device 130(N) that includes the assigned FQDN for the client device 130(N). Similarly, the registrar server 220 may also assign FQDNs to each of the services 250 exposed to the smart network 102 by the client device 130(N) and transmit each of the FQDNs assigned to the different services 250 back to the registration module 264 as well. Once the client device 130(N) and services 250 are registered with the smart network host device 120, the registration module 264 may enable the client device 130(N) or services 250 to transmit data to or receive data from various devices connected to the smart network 102. For example, the registration module 264 may be configured to discover other client devices 130 or services 250 that are available to a client device 130(N) connected to the smart network 102 in response to a query sent from the registration module 264 to the smart network host device 120.

In one embodiment, the registration module 264 is configured to transmit an XML-SOAP message to the registrar server 220 that provides the registrar server 220 with information about the client device 130(N) such as manufacturer information, firmware information, status information, service information and the like. The registrar server 220 is configured to parse the XML-SOAP message to retrieve information necessary to register the client device 130(N) with the smart network 102. The registration module 264 may also be configured to retrieve details about the services 250 that are running on the client device 130(N) and transmit the details in an XML-SOAP message to the smart network host device 120. In another embodiment, the registration module 264 may be configured to update information stored by the registrar server 220 associated with the client device 130(N) or services 250. For example, a client device 130(N) that is configured to provide a storage service 250(1) to other client devices 130 or services 250 on the smart network 102 may exhaust the available storage space on the client device 130(N). Thus, the client device 130(N) may be configured to send an XML-SOAP message to the registrar server 220 that indicates that the service 250(1) is no longer available on the smart network 102.

The diagnostic module 266 is configured to implement operations that enable diagnostic services to be implemented for the client device 130(N). For example, software executing on a processor in the client device 130(N) may be configured to generate and transmit XML-SOAP messages to the smart network host device 120 that indicate the current status of the client device 130(N) and/or one or more services 250 running on the client device 130(N). The diagnostic module 266 may expose information about the configuration, network topology and historical connectivity of client devices 130 connected to the smart network 102 to aid in the debugging of network issues by a user of the smart network 102 or support staff associated with the manufacturer of the client device 130(N).

In one embodiment, portal 172 running on a computer 170 connected to the smart network 102 may be configured to transmit an XML-SOAP message to the diagnostic module 266 that queries the client device 130(N) for status updates. The client device 130(N) may generate a corresponding XML-SOAP message to transmit to the portal 172 that includes information on the current status of the client device 130(N) as well as zero or more services 250 running on the client device 130(N). For example, the status may indicate that the client device 130(N) is in a standby mode or some other power saving mode or the status may indicate that a service 250 is currently busy and cannot process a request from a different client device 130. In another embodiment, the diagnostic module 266 may be configured to transmit XML-SOAP messages to the smart network host device 120, which acts as a central repository for diagnostic information for all client devices 130 and services 250 connected to the smart network 102. In yet another embodiment, the diagnostic module 266 may be configured to gather diagnostic reports from other client devices 130 connected to the smart network 102, or from the smart network host device 120, and forward the diagnostic reports to a portal on the external network 110 hosted by the manufacturer of the client device 130(N) to aid in troubleshooting network problems experienced by the client device 130(N).

The firmware upgrade module 268 is configured to implement operations that enable updates to the firmware of the client device 130(N). In one embodiment, the firmware upgrade module 268 may be configured to receive XML-SOAP messages from the smart network host device 120 that request the client device 130 to connect to a portal on the external network 110 and download a firmware update for the client device 130. The firmware upgrade module 268 may also be configured to transmit an XML-SOAP message to the smart network host device 120 that identifies the current version of the firmware installed on the client device 130(N). The firmware upgrade module 268 may also be configured to determine whether updates to the firmware are available on the external network 110, schedule an update of the firmware to be installed on the client device, and ensure that the firmware update does not interrupt a pending operation between the client device 130(N) and a different client device 130 connected to the smart network 102. In another embodiment, the firmware upgrade module 268 may enable the firmware to be updated automatically by the smart network host device 120 or a service provided on the external network 110.

FIGS. 3A-3E are a flowchart of method steps 300 for connecting a client device 130(N) to a smart network 102, according to one example embodiment of the present invention. Although the method steps are described in conjunction with the network system 100 and a client device 130(N) of FIGS. 1A-1F and 2, persons skilled in the art will understand that any client device 130(N) configured to perform the method steps, in any order, is within the scope of the invention.

As shown, the method 300 begins at step 302, where a client device 130(N) connects to a wireless access point that provides connectivity to the smart network 102. In one embodiment, client device 130(N) includes a network discovery module 262 configured to attempt to connect to any wireless access point associated with a well-known SSID. If the network discovery module 262 detects that a wireless access point associated with the well-known SSID is in range, then the network discovery module 262 attempts to authenticate the client device 130(N) with a smart network host device 120 configured to provide the wireless access point associated with the well-known SSID. In another embodiment, the network discovery module 262 may be configured to determine a plurality of wireless access points associated with the well-known SSID that are within range of the client device 130(N). If there are no wireless access points associated with the well-known SSID within range of the client device 130(N), then the client device 130(N) may attempt to connect to any wireless access point that provides a connection to a wireless network. In such cases, the client device 130(N) may disable certain functions of the client device 130(N) that are optimized for use with a smart network host device 120. If there are more than one wireless access point associated with the same well-known SSID within range of the client device 130(N), then the client device 130(N) may attempt to connect to the wireless access point that is both associated with the well-known SSID and has the strongest wireless signal, which may indicate that the selected wireless access point is the closest wireless access point in proximity to the client device.

At step 304, the client device 130(N) attempts to authenticate itself with the smart network host device 120 associated with the wireless network corresponding to the wireless access point that the client device 130(N) successfully connected to in step 302. In one embodiment, the network discovery module 262 performs a handshake operation with the smart network host device 120 to authenticate the client device 130(N) with the smart network 102. The handshake operation may pass EAP messages from the smart network host device 120 to the client device 130(N) and from the client device 130(N) to the smart network host device 120. The EAP messages enable the client device 130(N) to verify that the smart network host device 120 possesses network credentials associated with the client device 130(N) and enables the smart network host device 120 to verify that the client device 130(N) possesses the same network credentials that the smart network host device 120 associates with the client device 130(N). The handshake operation allows such verification without ever transmitting the network credentials between the client device 130(N) and the smart network host device 120 via the wireless link 134. In one embodiment, the network credentials may be shared with the smart network host device 120 by physically placing an ID device 136(N) associated with the client device 130(N) in close proximity to the smart network host device 120. In other embodiments, the network credentials may be shared in any other technically feasible manner, such as via a USB key or by prompting a user to manually enter the network credentials via a user interface associated with the smart network host device 120.

At step 306, the client device 130(N) determines whether the authentication was successful. In one embodiment, if the client device 130(N) determines that the smart network host device 120 does not possess the correct network credentials for the client device 130(N) (i.e., the ID device 136(N) has not been read by the smart network host device 120), then the client device 130(N) terminates the wireless link established with the smart network host device 120, and method 300 returns to step 302 where the client device 130(N) attempts to establish a connection with another wireless network. Returning to step 306, if the client device 130(N) determines that the authentication was successful, then method 300 proceeds to step 308 where the client device 130(N) transmits data that includes information related to the client device 130(N) such as capabilities of the client device 130(N) or information about services 250 running on the client device 130(N).

At step 308, the client device 130(N) receives a response message from the smart network host device 120 that indicates a new wireless access point to establish a secure connection between the smart network host device 120 and the client device 130(N). At step 310, the client device 130(N) establishes a secure connection to the new wireless access point. In one embodiment, the client device 130(N) re-connects to the new wireless access point and establishes a secure socket connection via any technically feasible protocol such as the secure socket layer (SSL), transport layer security (TLS), or X.509 protocols. Once the secure connection is established, method 300 proceeds to step 312 where the client device 130(N) receives yet another SSID and associated network credentials for a user-level wireless access point. In one embodiment, an owner may establish the SSID and network credentials for the user-level wireless access point prior to step 312, such as during the setup of the smart network host device 120, which are then passed to the client device 130(N) via the secure connection established in step 310. Consequently, the client device 130(N) uses the SSID and network credentials established by the owner for normal operation, whereas the lower level virtual access points are established by the smart network host device 120 to enable easy connection of the client device 130(N) to the smart network 102 with little manual configuration required by the owner. For example, the owner may configure the smart network host device 120 during an initial setup routine, providing an SSID and network credentials that the owner establishes and that may be broadcast by the smart network host device 120. However, each client device 130(N) configured for use with the smart network that is introduced to the smart network will establish a secure connection to the smart network host device 120 via the paired ID device 136(N), which only needs to be placed in proximity of the smart network host device 120, and will automatically retrieve the owner's SSID and network credentials from the smart network host device 120 without requiring the owner of the smart network 102 to remember and re-enter the SSID and network credentials for each new device added to the smart network 102. At step 314, client device 130(N) establishes a secure connection to the user-level wireless access point.

Figure 3A:
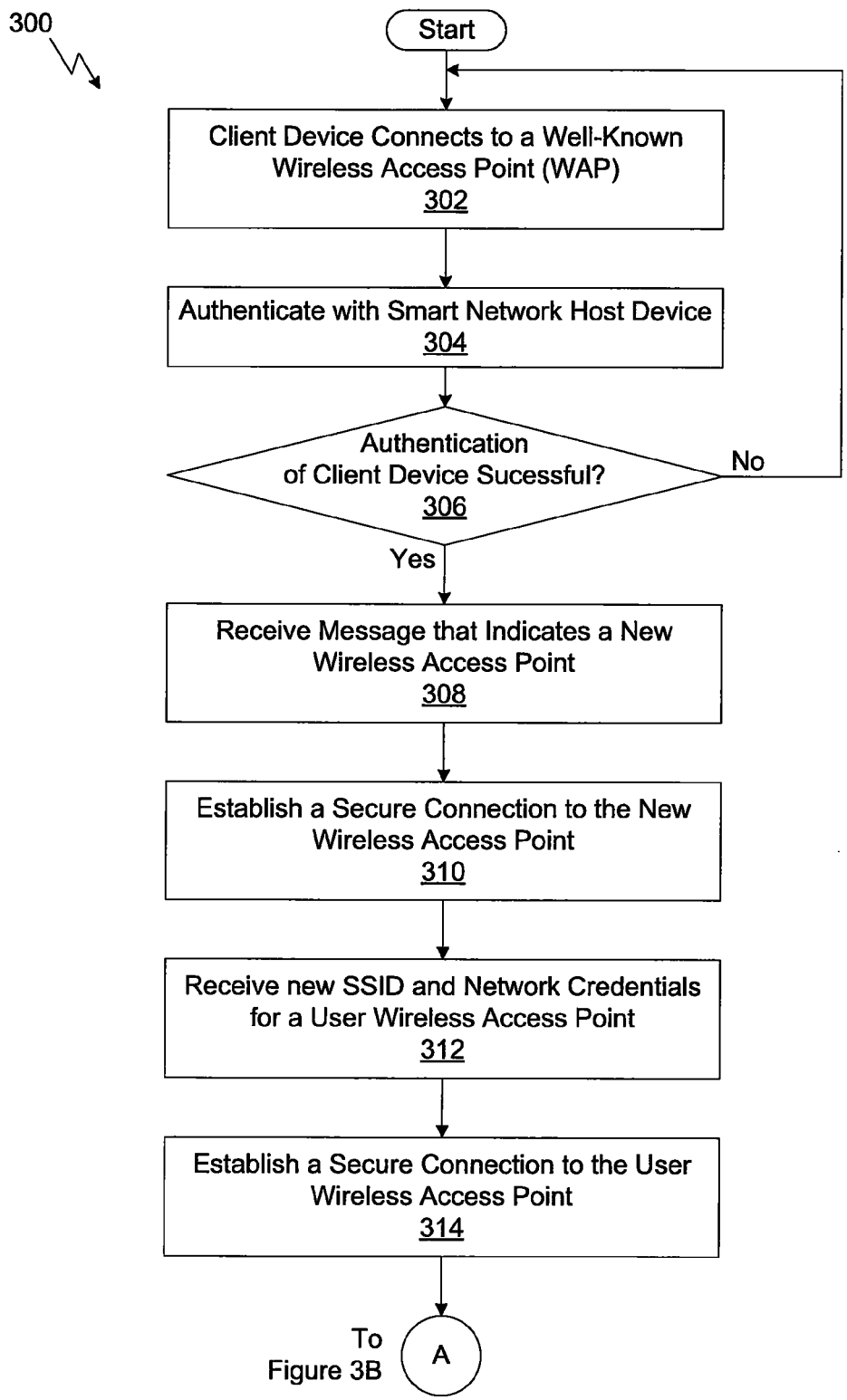
FIGS. 3A-3E are a flowchart of method steps for connecting a client device to a smart network, according to one example embodiment of the present invention.
Figure 3B:
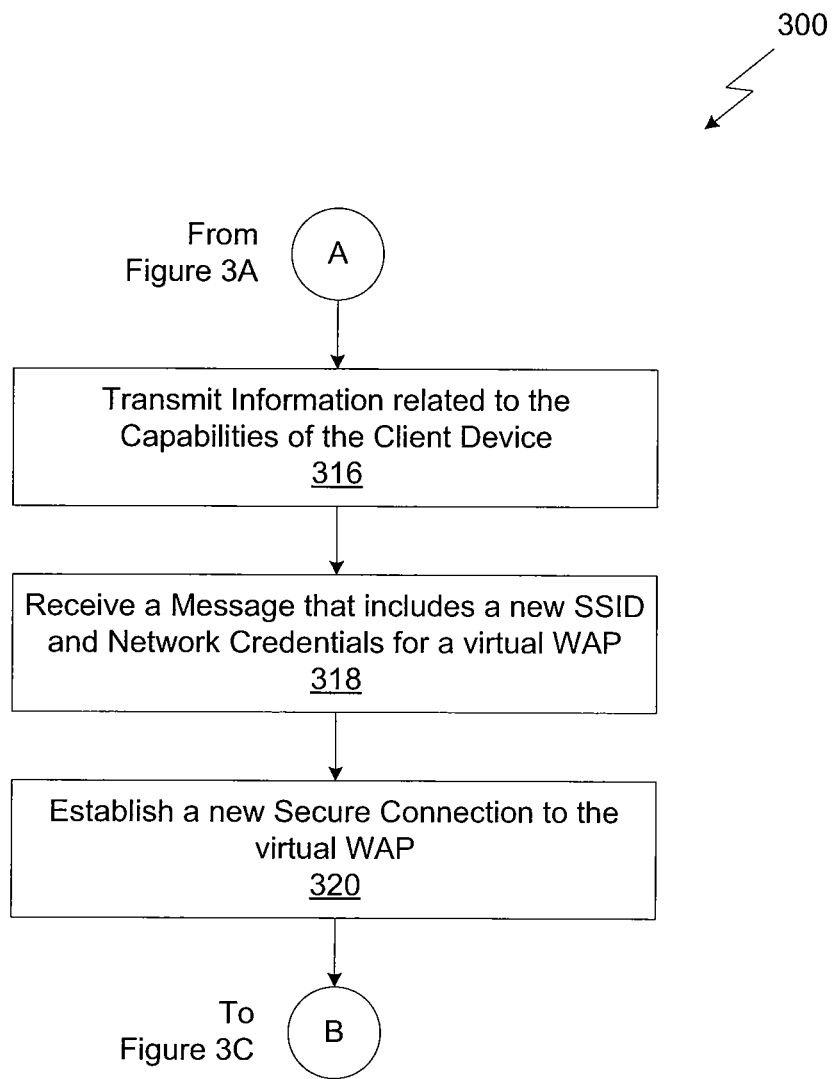

At step 316 and as shown in FIG. 3B, the client device 130(N) may transmit information related to the client device 130(N) to the smart network host device 120, which determines whether the client device 130(N) should connect to a different virtual access point established by the smart network host device 120. At step 318, the client device 130(N) may receive a message from the smart network host device 120 that includes a new SSID and network credentials for a new virtual access point established by the smart network host device 120 and instructs the client device 130(N) to re-connect to the new virtual access point. At step 320, the client device 130(N) may terminate the connection to the smart network host device 120 and re-connect to the new virtual access point using the new SSID and network credentials received in step 314, and the method 300 proceeds to step 316.

Figure 3C:
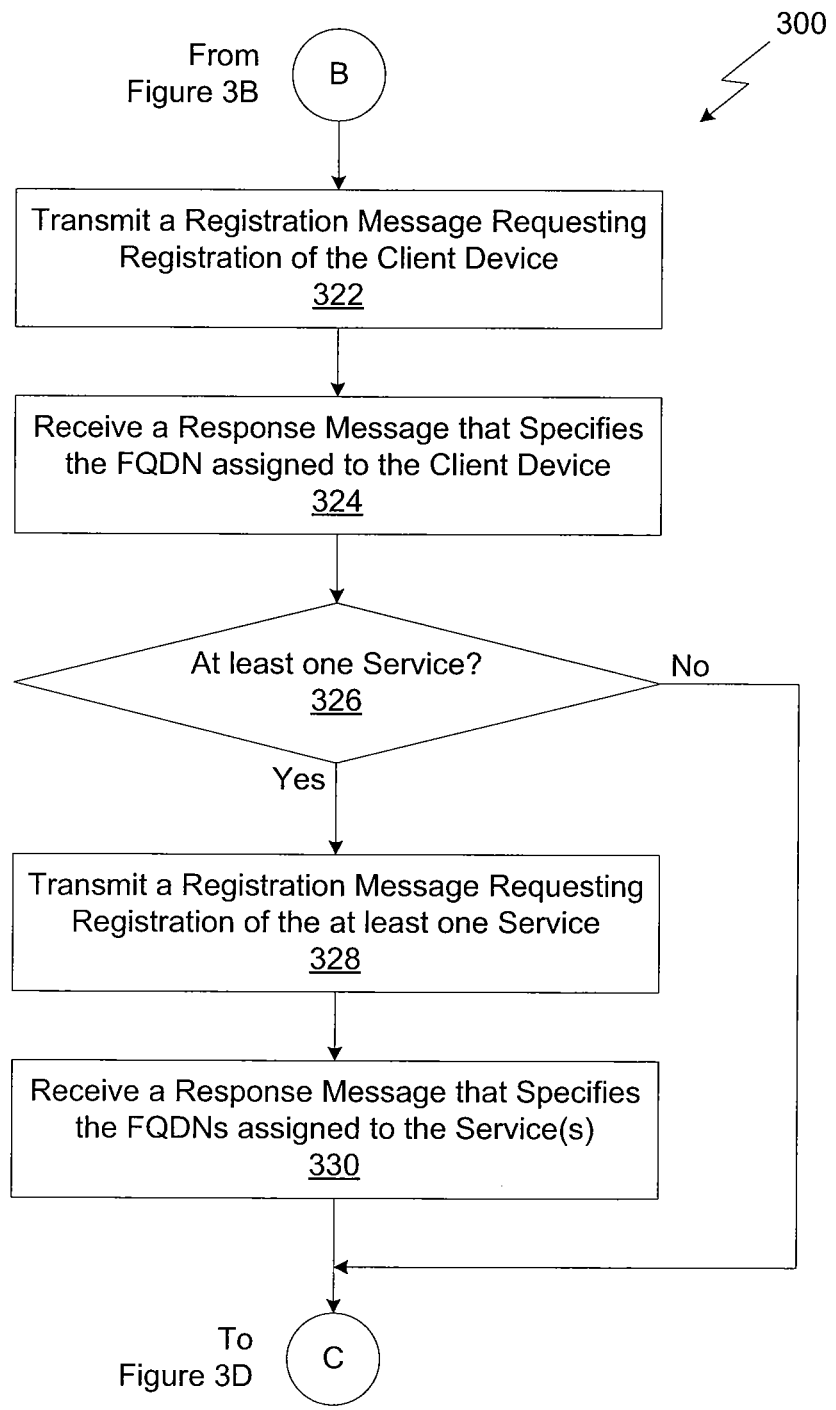

At step 322 and as shown in FIG. 3C, a client device 130(N) transmits a registration message to the smart network host device 120. In one embodiment, a client device 130(N) includes a registration module 264 configured to transmit an XML-SOAP message to the smart network host device 120 that requests the client device 130(N) to be registered with the smart network host device 120. At step 324, the client device 130(N) receives a response message from the smart network host device 120 that includes an FQDN assigned to the client device 130(N) by the smart network host device 120. At step 326, the client device 130(N) determines whether the client device 130(N) is configured to expose at least one service 250 to the smart network. If the client device 130(N) is not configured to expose any services 250, then method 300 proceeds to step 332. Returning to step 326, if the client device 130(N) is configured to expose at least one service 250, then method 300 proceeds to step 328 where client device 130(N) transmits a registration message to the smart network host device 120 requesting the at least one service to be registered with the smart network 102. At step 330, the client device 130(N) receives a response message from the smart network host device 120 that includes one or more FQDNs corresponding to each instance of the at least one service running on the client device 130(N).

Figure 3D:
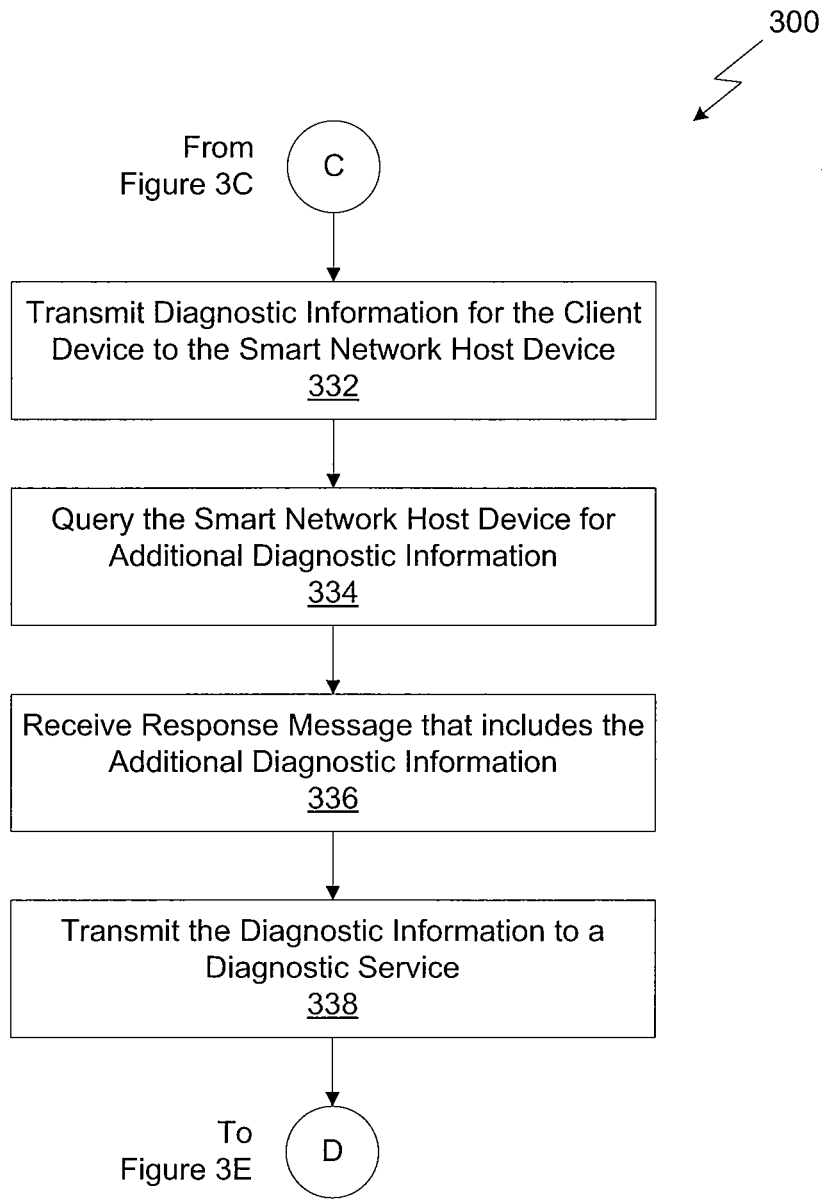

At step 332 and as shown in FIG. 3D, a client device 130(N) transmits diagnostic information about the client device 130(N) to the network host. In one embodiment, a client device 130(N) includes a diagnostic module 266 configured to collect information such as status information related to the client device 130(N), status information related to any services 250 running on the client device 130(N), or any other type of relevant information that may be used to troubleshoot issues with the client device 130(N) or smart network 102. The smart network host device 120 may act as a central repository for all diagnostic information, and may track historical trends in diagnostic information. At step 334, client device 130(N) queries the smart network host device 120 to request additional diagnostic information related to other devices connected to the smart network 102. At step 336, the client device 130(N) receives a response from the smart network host device 120 that includes at least some additional diagnostic information related to the smart network 102. At step 338, the client device 130(N) may be configured to transmit the diagnostic information related to the client device 130(N) as well as the additional diagnostic information related to other devices connected to the smart network 102 to a service configured to enable troubleshooting of the client device 130(N) or smart network 102. In one embodiment, the diagnostic service may be hosted by a computer 170 connected to the smart network 102. In alternative embodiments, the diagnostic service may be hosted by a portal stored on a computer connected to the external network 110, such as a service accessible on the manufacturer of the client device's 130(N) website.

Figure 3E:
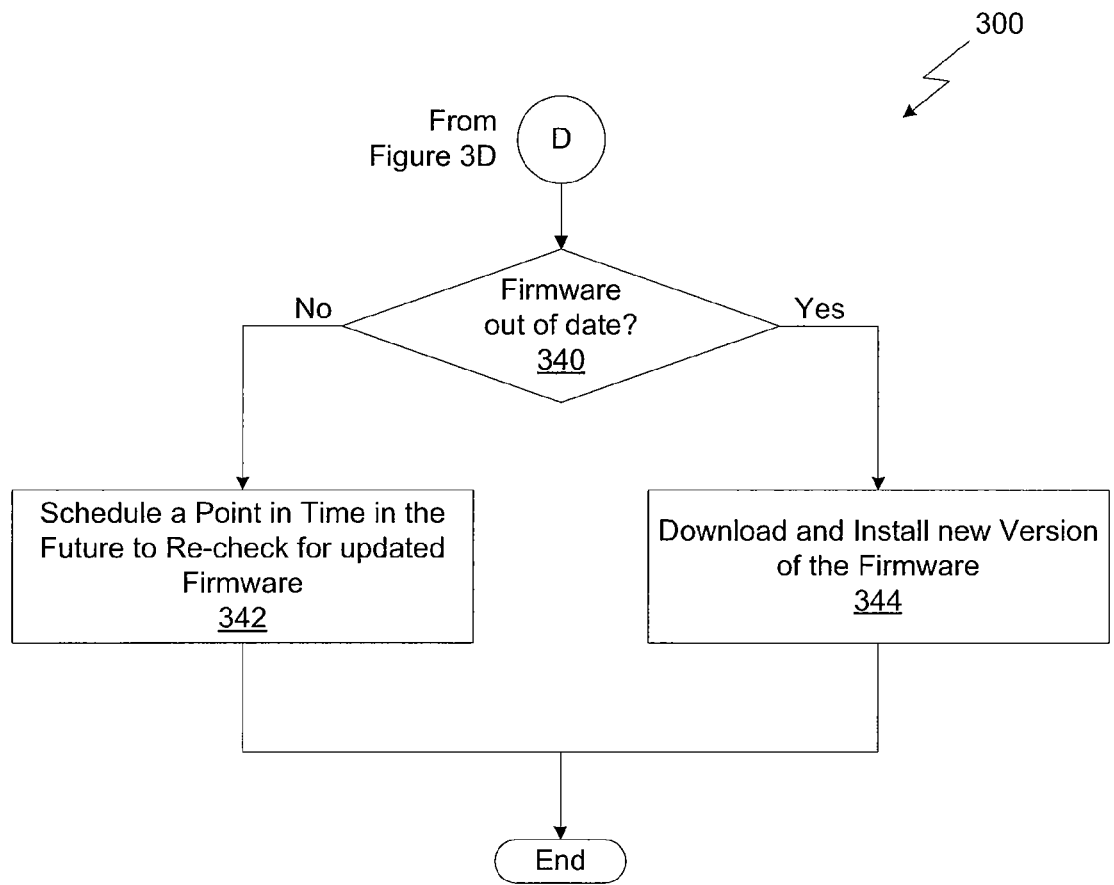

At step 340 and as shown in FIG. 3E, a client device 130(N) may be configured to determine whether the firmware installed on the client device 130(N) is out of date. In one embodiment, the client device 130(N) may include a firmware upgrade module 268 configured to compare a version number associated with the firmware installed on the client device to a version number associated with new firmware available on a remote server of an external network. For example, a manufacturer may provide an applet 174(J) to the applet store 116 that is configured to periodically check a manufacturer's server to determine if a new firmware version is available. If a new firmware version is available, the applet 174(J), running on portal 172 on computer 170, may be configured to download the new firmware to a memory in the computer 170. The new firmware may include a version number that can be compared to a version number of firmware currently installed on the client device 130(N) by the firmware upgrade module 268.

If the firmware installed on the client device 130(N) is not out of date, then the method 300 proceeds to step 342 where the client device 130(N) may schedule a future time to re-determine whether the firmware installed on the client device 130(N) is out of date. For example, the firmware upgrade module 268 may be configured to query the portal 172 to determine if new firmware for the client device is available. If new firmware is not available, then the firmware upgrade module 268 may set a reminder to query the portal 172 every 5 days to check for the availability of new firmware. Returning now to step 340, if the firmware installed on the client device 130(N) is out of date, then the method 300 proceeds to step 344 where the client device 130(N) downloads the new firmware version and installs the new firmware version on the client device 130(N). In one embodiment, the firmware upgrade module 268 may be configured to download the new firmware version from the portal 172. In another embodiment, the firmware upgrade module 268 may be configured to download the new firmware version from a remote server located on the external network.

In sum, example embodiments of the invention provide systems and methods for connecting a client device to a wireless network. A client device may include various modules for connecting to and performing operations on the wireless network. A network discovery module facilitates establishing a secure connection between the client device and a central authority for the wireless network; a registration module facilitates exposing the client device and services to other devices connected to the wireless network; a diagnostic module facilitates sharing information about the wireless network with a diagnostic service configured to help with troubleshooting network issues; and a firmware upgrade module facilitates automatic updates of firmware installed on the client device.

Advantageously, the disclosed client device in combination with the central authority for the wireless network, enables seamless and automatic configuration of client devices introduced to a secure home wireless network without requiring manual configuration by a user. The modules described above enable a user to buy a product, plug it in, and substantially immediately enable the client device to collaborate with other devices connected to the smart network, such as by providing services or enabling other devices to access resources included in the client device, without any burdensome manual configuration by the user.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the invention may be devised without departing from the basic scope thereof. Therefore, the scope of the present invention is determined by the claims that follow.

We claim:

1. A method, comprising:
establishing a connection with a first wireless access point that is associated with a wireless home network;
transmitting information related to a client device to a network host machine that is associated with the wireless home network via the first wireless access point;
receiving a Service Set Identifier (SSID) corresponding to a second wireless access point associated with the wireless home network, wherein the second wireless access point is selected by the network host machine based on the transmitted information related to the client device;
transmitting a message to the network host machine requesting that the network host machine register the client device with the wireless home network;
receiving a response message from the network host machine specifying a fully qualified domain name that has been assigned to the client device by the network host machine; and
establishing a connection with the second wireless access point corresponding to the SSID.

2. The method of claim 1, wherein establishing a connection with the first wireless access point comprises:
attempting to connect to a first virtual access point associated with a first SSID; and
upon establishing a connection to the first virtual access point:
confirming that the client device is authenticated with the network host machine,
receiving a second SSID corresponding to a second virtual access point, and
establishing a connection to the second virtual access point.

3. The method of claim 1, further comprising:
transmitting a second message to the network host machine requesting that the network host machine register with the wireless home network one or more services exposed to the wireless home network by the client device; and
receiving a second response message from the network host machine specifying one or more fully qualified domain names that have been assigned to the one or more services by the network host machine.

4. The method of claim 1, further comprising:
transmitting diagnostic information related to the client device to the network host machine;
querying the network host machine to request additional diagnostic information related to other devices also connected to the wireless home network;
receiving a response message from the network host machine that includes the additional diagnostic information related to the other devices; and
transmitting the diagnostic information and the additional diagnostic information to a service hosted on a machine that is connected to the wireless home network or to a machine that is connected to a remote network.

5. The method of claim 4, further comprising transmitting to the network host machine further diagnostic information related to one or more services exposed to the wireless home network by the client device.

6. The method of claim 1, further comprising:
determining whether firmware installed on the client device is out of date by comparing a version number associated with the firmware to a version number associated with new firmware available on a machine associated with a remote network; and if the firmware installed on the client device is not out of date, then scheduling a future time to re-determine whether the firmware installed on the client device is out of date, or if the firmware installed on the client device is out of date, then downloading the new firmware from the machine associated with the remote network and installing the new firmware on the client device.

7. A client device, comprising:

one or more computer processors; and a memory containing a program, which when executed by the one or more computer processors, performs an operation comprising:

establishing a connection with a first wireless access point that is associated with a wireless home network;

transmitting information related to the client device to a network host machine that is associated with the wireless home network via the first wireless access point;

receiving a Service Set Identifier (SSID) corresponding to a second wireless access point that is to be associated with the wireless home network, wherein the second wireless access point is selected by the network host machine based on the transmitted information related to the client device;

transmitting a message to the network host machine requesting that the network host machine register the client device with the wireless home network;

receiving a response message from the network host machine specifying a fully qualified domain name that has been assigned to the client device by the network host machine; and establishing a connection with the second wireless access point corresponding to the SSID.

8. The client device of claim 7, wherein establishing a connection with the first wireless access point comprises:

attempting to connect to a first virtual access point associated with a first SSID; and upon establishing a connection to the first virtual access point:

confirming that the client device is authenticated with the network host machine, receiving a second SSID corresponding to a second virtual access point, and establishing a connection to the second virtual access point.

9. The client device of claim 7, the operation further comprising:

transmitting a second message to the network host machine requesting that the network host machine register with the wireless home network one or more services exposed to the wireless home network by the client device; and receiving a second response message from the network host machine specifying one or more fully qualified domain names that have been assigned to the one or more services by the network host machine.

10. The client device of claim 7, the operation further comprising:

transmitting diagnostic information related to the client device to the network host machine;

querying the network host machine to request additional diagnostic information related to other devices also connected to the wireless home network;

receiving a response message from the network host machine that includes the additional diagnostic information related to the other devices; and transmitting the diagnostic information and the additional diagnostic information to a service hosted on a machine that is connected to the wireless home network or to a machine that is connected to a remote network.

11. The client device of claim 10, the operation further comprising transmitting to the network host machine further diagnostic information related to one or more services exposed to the wireless home network by the client device.

12. The client device of claim 7, the operation further comprising:

determining whether firmware installed on the client device is out of date by comparing a version number associated with the firmware to a version number associated with new firmware available on a machine associated with a remote network; and if the firmware installed on the client device is not out of date, then scheduleing a future time to re-determine whether the firmware installed on the client device is out of date, or if the firmware installed on the client device is out of date, then downloading the new firmware from the machine associated with the remote network and installing the new firmware on the client device.

13. A non-transitory computer-readable medium including instructions that, when executed by a processing unit, cause the processing unit to perform the steps of:

establishing a connection with a first wireless access point that is associated with a wireless home network;

transmitting information related to a client device to a network host machine that is associated with the wireless home network via the first wireless access point;

receiving a Service Set Identifier (SSID) corresponding to a second wireless access point associated with the wireless home network, wherein the second wireless access point is selected by the network host machine based on the transmitted information related to the client device;

transmitting a message to the network host machine requesting that the network host machine register the client device with the wireless home network;

receiving a response message from the network host machine specifying a fully qualified domain name that has been assigned to the client device by the network host machine; and establishing a connection with the second wireless access point corresponding to the SSID.

14. The non-transitory computer readable medium of claim 13, wherein establishing the connection with the first wireless access point comprises:

attempting to connect to a first virtual access point associated with a first SSID; and upon establishing a connection to the first virtual access point:

confirming that the client device is authenticated with the network host machine, receiving a second SSID corresponding to a second virtual access point, and establishing a connection to the second virtual access point.

15. The non-transitory computer readable medium of claim 13, the steps further comprising:

transmitting a second message to the network host machine requesting that the network host machine register with the wireless home network one or more services exposed to the wireless home network by the client device; and receiving a second response message from the network host machine specifying one or more fully qualified domain names that have been assigned to the one or more services by the network host machine.

16. The non-transitory computer readable medium of claim 13, the steps further comprising:

transmitting diagnostic information related to the client device to the network host machine;

querying the network host machine to request additional diagnostic information related to other devices also connected to the wireless home network;

receiving a response message from the network host machine that includes the additional diagnostic information related to the other devices; and transmitting the diagnostic information and the additional diagnostic information to a service hosted on a machine that is connected to the wireless home network or to a machine that is connected to a remote network.

17. The non-transitory computer readable medium of claim 13, the steps further comprising:

determining whether firmware installed on the client device is out of date by comparing a version number associated with the firmware to a version number associated with new firmware available on a machine associated with a remote network; and if the firmware installed on the client device is not out of date, then scheduling a future time to re-determine whether the firmware installed on the client device is out of date, or if the firmware installed on the client device is out of date, then downloading the new firmware from the machine associated with the remote network and installing the new firmware on the client device.

18. A non-transitory computer-readable medium including instructions that, when executed by a processing unit, cause the processing unit to perform the steps of:

establishing a connection with a first wireless access point that is associated with a wireless home network;

transmitting information related to a client device to a network host machine that is associated with the wireless home network via the first wireless access point;

receiving a Service Set Identifier (SSID) corresponding to a second wireless access point that is to be associated with the wireless home network, wherein the second wireless access point is selected by the network host machine based on the transmitted information related to the client device;

establishing a connection with the second wireless access point corresponding to the SSID;

transmitting diagnostic information related to the client device to the network host machine;

querying the network host machine to request additional diagnostic information related to other devices also connected to the wireless home network;

receiving a response message from the network host machine that includes the additional diagnostic information related to the other devices;

transmitting the diagnostic information and the additional diagnostic information to a service hosted on a machine that is connected to the wireless home network or to a machine that is connected to a remote network; and transmitting to the network host machine further diagnostic information related to one or more services exposed to the wireless home network by the client device.

* * * * *